(12) United States Patent
Vanstone et al.

(10) Patent No.: US 6,349,318 B1
(45) Date of Patent: Feb. 19, 2002

(54) ARITHMETIC PROCESSOR FOR FINITE FIELD AND MODULE INTEGER ARITHMETIC OPERATIONS

(75) Inventors: Scott A. Vanstone, Waterloo; Robert J. Lambert, Cambridge; Robert Gallant, Mississauga, all of (CA); Aleksandar Jurisic, Ijubljana (YU); Ashok V. Vadekar, Rockwood (CA)

(73) Assignee: Certicom Corp., Ontario (CA)

( * ) Notice: Subject to any disclaimer, the term of this patent is extended or adjusted under 35 U.S.C. 154(b) by 0 days.

(21) Appl. No.: 09/418,217

(22) Filed: Oct. 14, 1999

Related U.S. Application Data

(63) Continuation of application No. PCT/CA98/00467, filed on Apr. 20, 1998.

(30) Foreign Application Priority Data

Apr. 18, 1997 (GB) .............................................. 9707861

(51) Int. Cl.[7] .................................................. G06F 7/00
(52) U.S. Cl. ...................................................... 708/492
(58) Field of Search ................................ 708/491–492; 380/28

(56) References Cited

U.S. PATENT DOCUMENTS 5,268,584 A    12/1993  Ikumi ......................... 364/736
5,459,681 A    10/1995  Harrison et al. ............ 364/736
6,009,450 A  * 12/1999  Dworkin et al. ............ 708/492

FOREIGN PATENT DOCUMENTS

EP            0267836            5/1988

OTHER PUBLICATIONS

Fuchs, K.C.: "Cryptographic Signal Processor" Motorola Technical Developments, vol.. 27, May 1, 1996, p. 81/82, XP000594566.

* cited by examiner

Primary Examiner—Tan V. Mai
(74) Attorney, Agent, or Firm—Finnegan, Henderson, Farabow, Garrett & Dunner, L.L.P.

(57) ABSTRACT

The present disclosure provides an arithmetic processor having an arithmetic logic unit having a plurality of arithmetic circuits each for performing a group of associated arithmetic operations, such as finite field operations, or modular integer operations. The arithmetic logic unit has an operand input data bus, for receiving operand data thereon and a result data output bus for returning the results of the arithmetic operations thereon. A register file is coupled to the operand data bus and the result data bus. The register file is shared by the plurality of arithmetic circuits. Further a controller is coupled to the ALU and the register file, the controller selecting one of the plurality of arithmetic circuits in response to a mode control signal requesting an arithmetic operation and for controlling data access between the register file and the ALU and whereby the register file is shared by the arithmetic circuits.

25 Claims, 11 Drawing Sheets

ARITHMETIC PROCESSOR FOR FINITE FIELD AND MODULE INTEGER ARITHMETIC OPERATIONS

This application is a continuation of International Application No. PCT/CA98/00467, filed Apr. 20, 1998, the content of which is incorporated herein by reference.

The present invention relates to a method and apparatus for performing finite field and integer arithmetic.

BACKGROUND OF THE INVENTION

Elliptic Curve(EC) cryptography over a finite field require arithmetic operations of addition, multiplication, squaring and inversion. Additionally, subtraction operations are also required if the field is not of characteristic two. Modular arithmetic operations are also required, for example in computing signatures, however these operations are required less frequently than the finite field operations. EC cryptography as an example, requires the full complement of modular and finite field operations, addition, subtraction, multiplication and inversion.

Field sizes for cryptography tend to be relatively large, requiring fast, dedicated processors to perform the arithmetic operations in an acceptable time. Thus there have been numerous implementations of either fast modular arithmetic processors or dedicated processors for performing arithmetic operations in $F_2^n$. The use of special purpose or dedicated processors is well known in the art. These processors are generally termed coprocessors and are normally utilized in a host computing system, whereby instructions and control is provided to the coprocessor from a main processor.

Traditionally RSA was the encryption system of choice, however with the advent of superior and more secure EC cryptography the need for processors that perform modular exponentiation exclusively is becoming less imperative. However, while users are in transition from RSA cryptography to EC cryptography there is a need for an arithmetic processor that supports both these operations, with little or no penalty in performance and cost.

SUMMARY OF THE INVENTION

It is an object of the invention to provide a processor that combines finite field arithmetic and integer arithmetic and for providing the operations required for EC cryptography, and modular exponentiation as required for example in RSA cryptography.

It is a further object of the invention to provide an arithmetic processor design that may be scaled to different field or register sizes.

A still further object of the invention is to provide an arithmetic processor that may be used with different field sizes.

A still further object of the invention is to provide an arithmetic processor that is capable of being scaled to provide an increase in speed when performing multi-sequence operations by simultaneously executing multiple steps in the sequence.

In accordance with this invention there is provided an arithmetic processor comprising:

(a) an arithmetic logic unit having a plurality of arithmetic circuits each for performing a group of associated arithmetic operations, the arithmetic logic unit having an operand input data bus for receiving operand data thereon and a result data output bus for returning the results of said arithmetic operations thereon;

(b) a register file coupled to said operand data bus and said result data bus; and (c) a controller coupled to said ALU and said register file, said controller selecting one of said plurality of arithmetic circuits in response to a mode control signal requesting an arithmetic operation and for controlling data access between said register file and said ALU and whereby said register file is shared by said arithmetic circuits.

In accordance with a further embodiment of the invention, there is provided a processor that includes finite field circuitry and integer arithmetic circuitry and which includes general-purpose registers, and special-purpose registers.

In accordance with a further embodiment of the invention there is provided an arithmetic processor that performs both finite field arithmetic and integer arithmetic and in which both special purpose registers and general purpose registers, and arithmetic circuits, are shared. For this purpose, a polynomial basis for the finite field hardware will be assumed, since this basis is similar to the standard radix-power basis of the integers.

BRIEF DESCRIPTION OF THE DRAWINGS

Embodiments of the invention will now be described by way of example only with reference to the accompanying drawings in which.

DETAILED DESCRIPTION OF A PREFERRED EMBODIMENT

Figure 1:
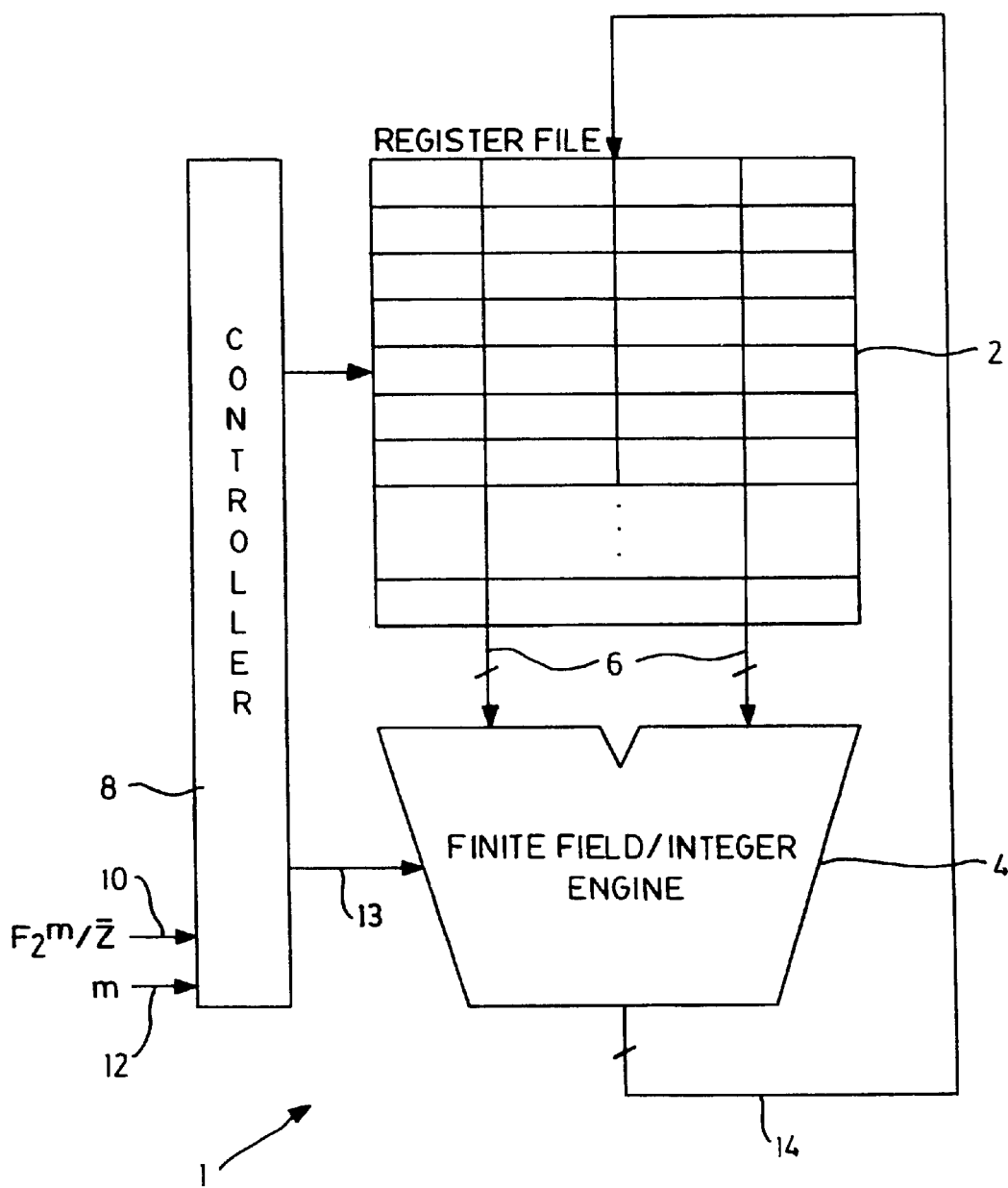
FIG. 1 is a block diagram of an arithmetic processor architecture for performing finite field arithmetic and integer arithmetic.

Referring to FIG. 1, an embodiment of an arithmetic processor is shown generally by numeral 1. As will be appreciated it may be used alongside a general purpose processor in an integrated computing system, where data is exchanged between the computing system and the arithmetic processor. The arithmetic processor includes a group of general purpose registers (GP) 2, termed a register file (which may be used as intermediate storage for EC point additions, point doublings, etc.), which communicate with an arithmetic-logic unit (ALU) 4, via data input or operand buses 6. The ALU 4 includes shared finite field and integer arithmetic circuitry. A data output or result bus 14 is provided from the ALU 4 to the register file 2 for writing results of computations performed in the ALU 4 to the register file 2.

Computational operations of the ALU 4 is controlled via micro-programmed instructions residing in a controller 8 section of the arithmetic processor 1. A mode selection control 10 is provided to select between either finite field computations or modular integer computations. A field size control 12 is also provided for initializing the ALU 4 to accommodate different operand vector sizes. Thus the controller 8 performs the following tasks amongst others: provides the appropriate arithmetic mode and operation to the ALU 4; coordinates data access between the register file 2 and the ALU 4; and provides to the ALU 4 the appropriate field size to be used.

The general-purpose registers are chosen to have a width large enough to handle at least the largest foreseeable $F_{2^m}$ EC cryptosystem. The registers may be combined to support larger lengths required for integer modular arithmetic. For example if a single register in the register file 2 is 512 bits wide, then four registers may be used to provide storage for a single 2048-bit RSA quantity. The GP registers are loaded with a block of data, e.g. a 2048-bit computation may be performed in blocks and then reassembled to obtain the full width result. Typically the arithmetic processor 1 is utilized in an existing host computer system and the controller 8 receives control signals from the host system and communicates data to the host data bus via a suitable host bus interface. Details of such an interface are well known in to those skilled in the art and will not be discussed further.

Figure 2:
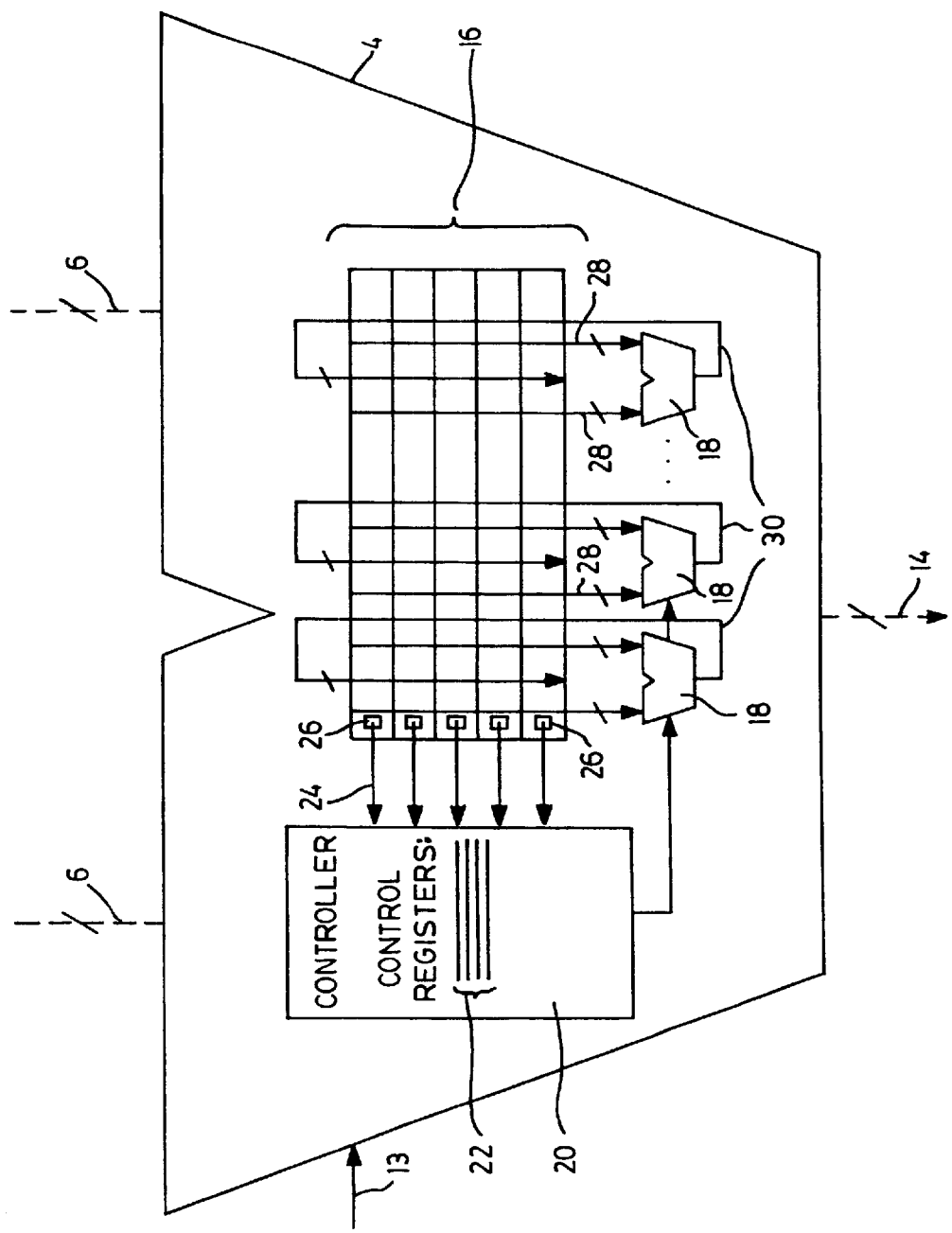
FIG. 2 is a block schematic diagram of the arithmetic logic unit (ALU) shown in FIG. 1.

Turning now to FIG. 2, the ALU 4 includes several special purpose registers 16, combinatorial logic and arithmetic circuitry contained in a plurality of sub-ALU's 18, which operate on one or more bits input from data buses 28 to each of the sub ALU's from the special purpose registers; output data buses 30 to the special purpose registers 16 from the sub ALU's 18 and its own controller 20. The controller 20 performs the following tasks amongst others: sequences the ALU 4 through steps in a computational operation; monitors control bits from the special purpose registers 16; and implements a counter in its own control registers 22 for determining the size of a field being used, a feature which allows the processor 1 to be used for different field sizes without having to redesign the processor hardware. In order to provide these functions, the control bits 26 of the special purpose registers 16 are provided as control bit inputs 24 to controller 20. The special purpose registers 16 are all individually addressable. The controller 20 also controls data input via the input buses 6 from and to the register file to the sub ALU's 16 or the special purpose registers 16. These sub-ALU's may operate on single bits or multiple bits at a time. Each of these components will be described in more detail below.

Figure 3:
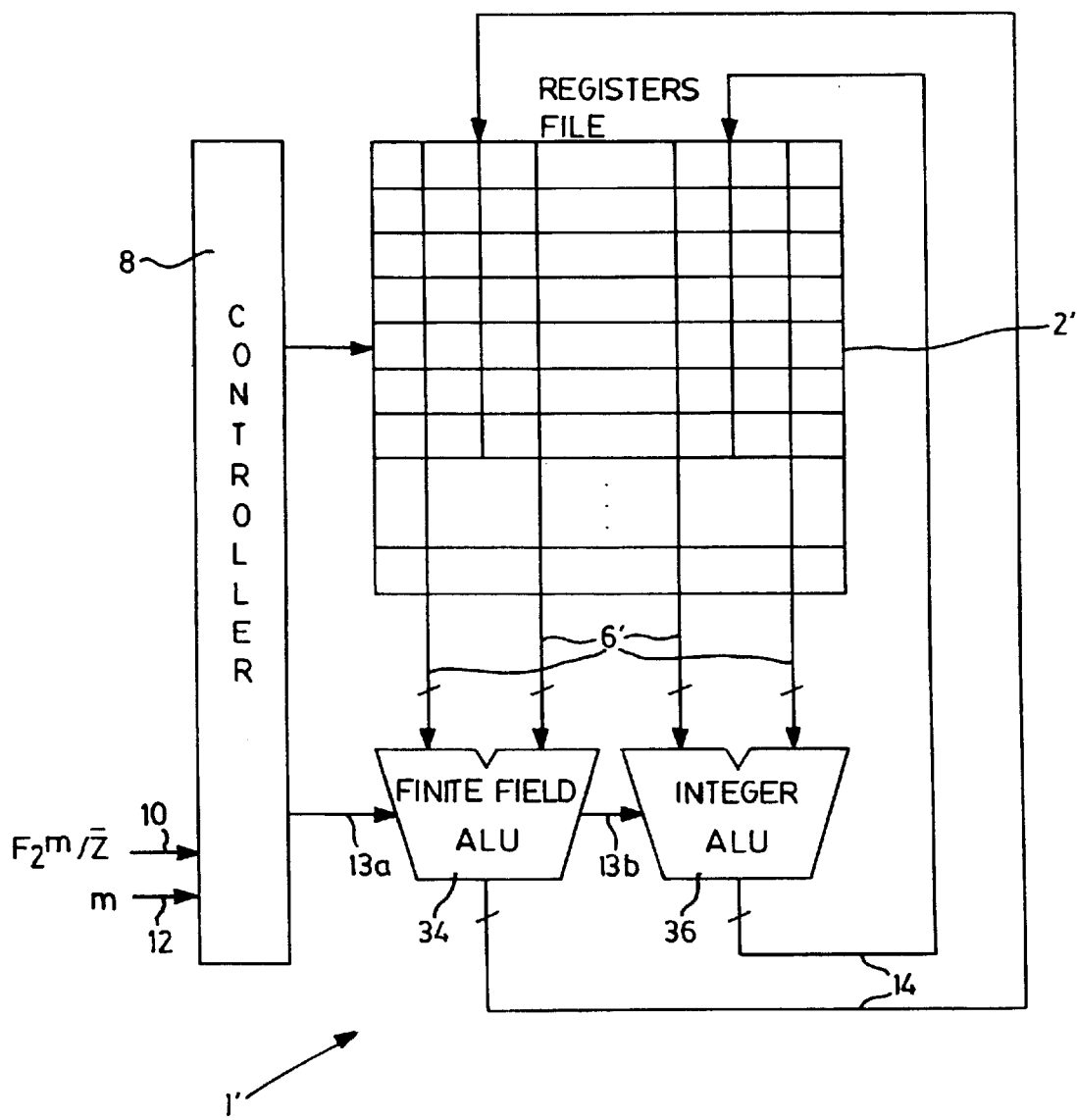
FIG. 3 is a block diagrams of an alternative embodiment of an arithmetic processor architecture for performing finite field arithmetic and integer arithmetic.

Referring to FIG. 3, an alternative embodiment of an arithmetic processor is shown generally by numeral 1'. In this embodiment a separate finite field unit 34 and integer modular arithmetic unit 36 is provided. This processor also includes a register file 2', data input buses 6', data output buses 14', and a controller 8', however, separate controls 13a and 13b are provided from the controller 8' to respective ALU's 34 and 36 respectively.

Figure 4:
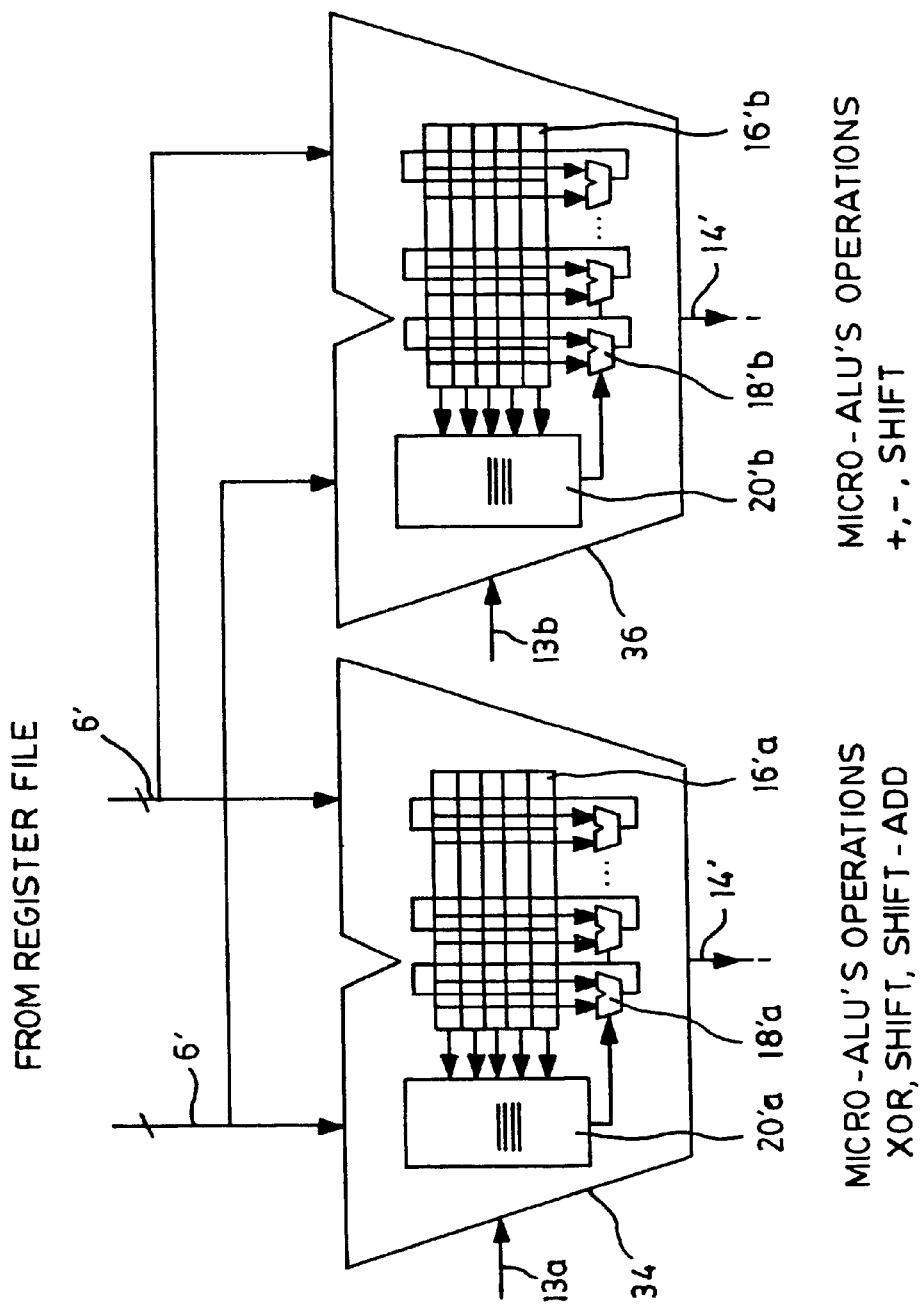
FIG. 4 is a block schematic diagram of the ALU shown in FIG. 3.

Referring to FIG. 4, the ALU's 34 and 36 of FIG. 3 are shown in greater detail. Each of the ALU's 34 and 36 include their own respective special-purpose registers 16'a and 16'b and controller 20'a and 20'b. Each of the ALU's 34 and 36 contain their own sub ALU's 18'a and 18'b respectively. Thus it may be seen that in this embodiment special purpose registers 16'a and 16'b and arithmetic and control circuitry is not shared. One or more of the sub ALU's 18'a perform in concert the functions of Shift left/right, XOR-shift and one or more of the sub ALU's 18'b perform in concert the function of integer add and integer subtract, with the option of using carry save techniques, or carry propagation.

Referring back to FIG. 2, the sub ALU's 18 perform the following logical functions on operands provided from the special purpose registers 16: XOR; Shift left/right, XOR-shift, integer add and integer subtract. These functions may be contained in one sub ALU 18 or across multiple sub ALUs. By providing multiple sub ALU's 18 the processor is capable of performing multiple operations, (e.g. for finite field inversion), simultaneously.

Figure 5A:
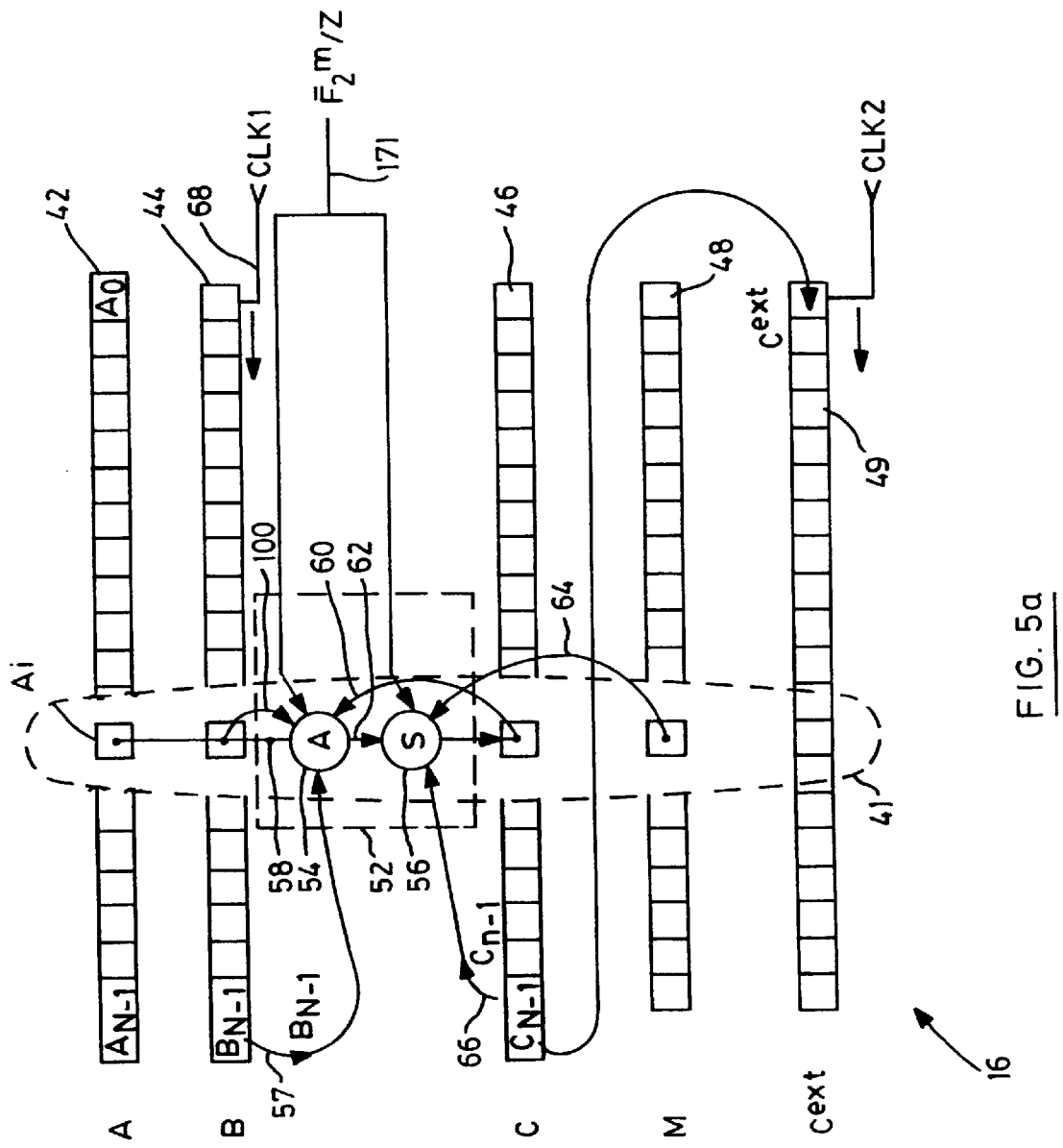
FIGS. 5(a), (b) and (c) are block diagrams of an embodiment of a bit-slice of the ALU shown in FIG. 2.
Figure 5C:
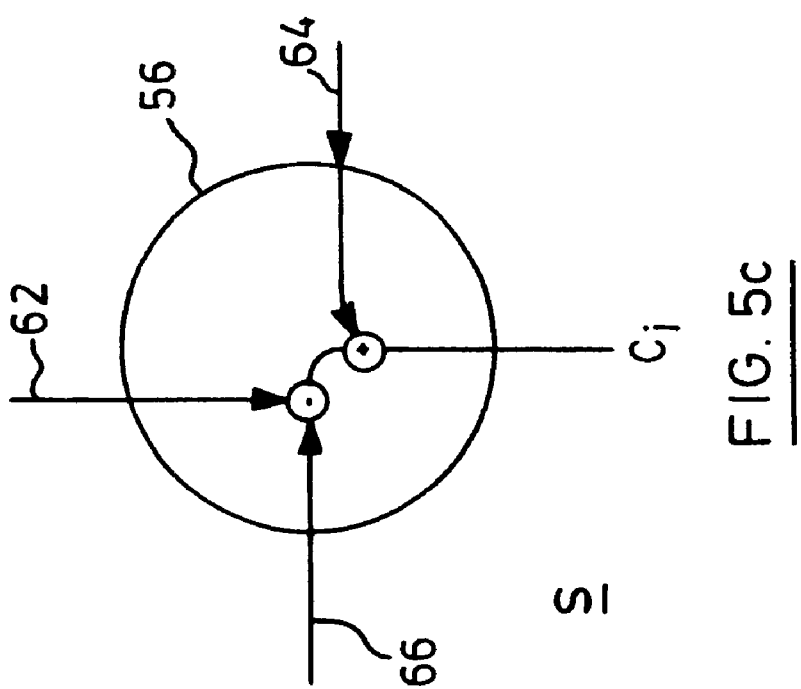
Figure 5B:
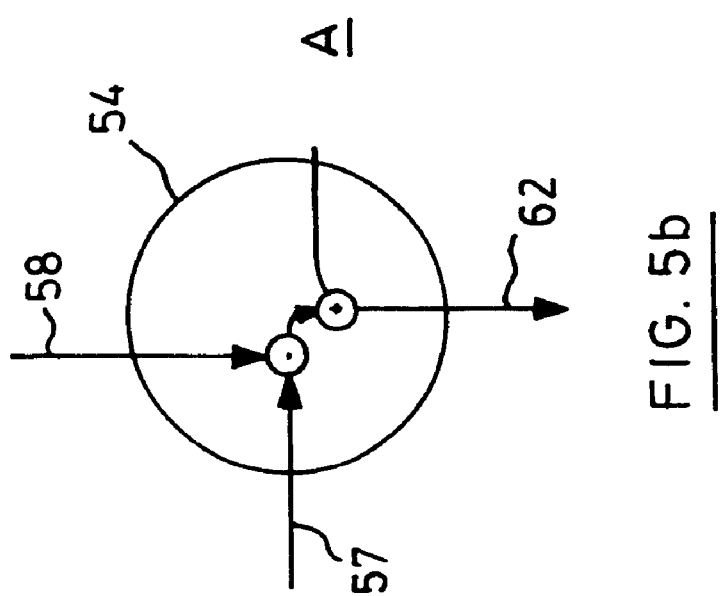

Turning now to FIG. 5, a bit-slice 41 of the ALU 4 shown in FIG. 2 is shown in greater detail. In the following discussion, we shall refer to the interconnection of cells of respective special-purpose registers in conjunction with its associated logic circuitry as a bit-slice 41. The logic circuitry contained in a bit slice is generally represented schematically by one of the sub ALU's 18 as shown in FIG. 2. It is then intended that the configuration of a bit slice may be repeated N times for an N-bit register. Furthermore, for clarity, we define N to be the number of cells in a register, and we refer to individual cells in a register as, for example, $A_i$ where $0 \leq i \leq N-1$ and wherein $A_{N-1}$ is the left most cell of the special-purpose register. The contents of a register will be referred to by lower case letters, for example, a bit vector A of length n will have bits numbered from $a_0 \ldots a_{n-1}$ with $a_0$ being the LSB. It may also be noted that although the special-purpose registers have been given specific names, these registers may take on different functions depending on the arithmetic operation being performed as will be described below.

In FIG. 5, the special-purpose registers 16 include: a pair of operand registers A 42 and B 44, to hold, for example, the multiplicand and multiplier, respectively, in a multiplication operation; an accumulator register C 46; a modulus register M 48; and a carry extension register $C^{ext}$ 50(used in integer arithmetic). The registers each have N cells for holding the respective binary digits of bit vectors loaded therein. It is preferable that these registers are shift registers. A sub ALU 18 shown in FIG. 2 may be implemented by the circuitry of block 52 in FIG. 5, and in a manner to be described below.

Multiplication

Operation of the ALU 4 may be best understood by reference to a specific arithmetic operation such as finite field multiplication. Consider the product C of two elements a and b, where a and b are bit vectors and wherein b will be of the form $b=(b_0, \ldots b_{n-1})$ in polynomial basis representation and a will be of the form $a=(a_0, \ldots a_{n-1})$ in polynomial basis representation. A modulus bit vector m has the form $m=(m_0, \ldots m_n)$. As will be noted the modulus register has one bit more than the number of bits required to represent the modulus. Alternatively, since the most significant bit $m_n$ is one, this bit might be implied and m represented by $(m_0, \ldots m_{n-1})$ In $F_2^n$, the multiplication may be implemented as a series of steps, which is more clearly set out by the following pseudo-code:

$C=0 \; \{C_{-1}=0\}$
For i from n−1 to 0 do
   For j from n−1 to 0 do $\{c_j = c_{j-1} + b_i a_j + c_{n-1} m_j\}$ In performing the multiplication, partial products of the multiplicand and each of the bits of $b_i$ of the multiplier, proceeding from the most significant bit (MSB) to the least significant bit (LSB), are formed. The partial products are reduced by the modulus if the MSB of the previous partial product is set.

Multiplication may be implemented by sequentially using a 1×N multiplier in which case the inner "for" loops of the preceding pseudocode is done in parallel. The modulus register M is loaded with the modulus bit vector m stripped of its most significant bit $m_n$ such that each cell contains a respective one of the binary digits $m_i$. In the implementation shown, the bits $m_i$ are arranged from left to right with the MSB of the vector being the leftmost bit, i.e. cell $M_{n-1}$ contains bit $m_{n-1}$. If N≠n still bit $M_{n-1}$ is stored in $M_{n-1}$, that is the data is left justified. The shift registers A and B are loaded with the finite field elements bit vectors a and b respectively so that each cell contains one of the binary digits $a_i$ or $b_i$. The finite field elements a and b are stored left justified, in their respective registers so that the topmost bit of the multiplier register b is always available at the left boundary cell bit, i.e. $(a_{n-1}, a_{n-2}, \ldots a_0)$ and $(b_{n-1}, b_{n-2}, \ldots b_0)$. If the length of the vectors a and b are less than the length of the registers; the remaining cells are padded with zeros. The above is generally performed by the controller 20 shown in FIG. 2. Other arrangements of sequential multiplication are possible (such as sequentially reducing the multiplicand), but such arrangements do not allow flexible field sizes along with fixed control bit locations. Bit ordering from LSB to MSB is also possible with corresponding changes in the multiplication algorithm.

A bit-slice 41 of the ALU 4 for implementing multiplication in a finite field is now described. The bit-slice 41 includes first and second controllable adders 54 and 56, respectively, each having an XOR function. The topmost cell $B_{N-1}$ of the register B provides an add control signal $b_{n-1}$ 57 to the first adder 54. Inputs 58 and 60 to the first adder 54 are derived from a register cell $A_i$ and accumulator cell $C_i$. An output 62 from the first adder 54 is connected to an input of the second adder 56 along with an input 64 from the modulus register cell $M_i$. The adder 54 performs the operation output 62=input 60+(input 58 and control 57) is shown in greater detail in FIG. 5(b).

The output from the second adder 56 is then connected the accumulator cell $C_i$. A second add control signal 66 is derived from the topmost cell $C_{N-1}$ of the accumulator C 46. It may be seen that this signal implements the modular reduction of the partial product in the accumulator C by the modulus vector in, when the topmost bit $C_{N-1}$ of C is set. The adder 56 performs the operation output=input 62+(input 64 and control 66) as shown in greater detail in FIG. 5(c). The B register is a clocked shift register. A clock signal CLK1 68, which may be provided by the controller 20 causes the contents of this register to be shifted left for each partial product, calculated.

Figure 6:
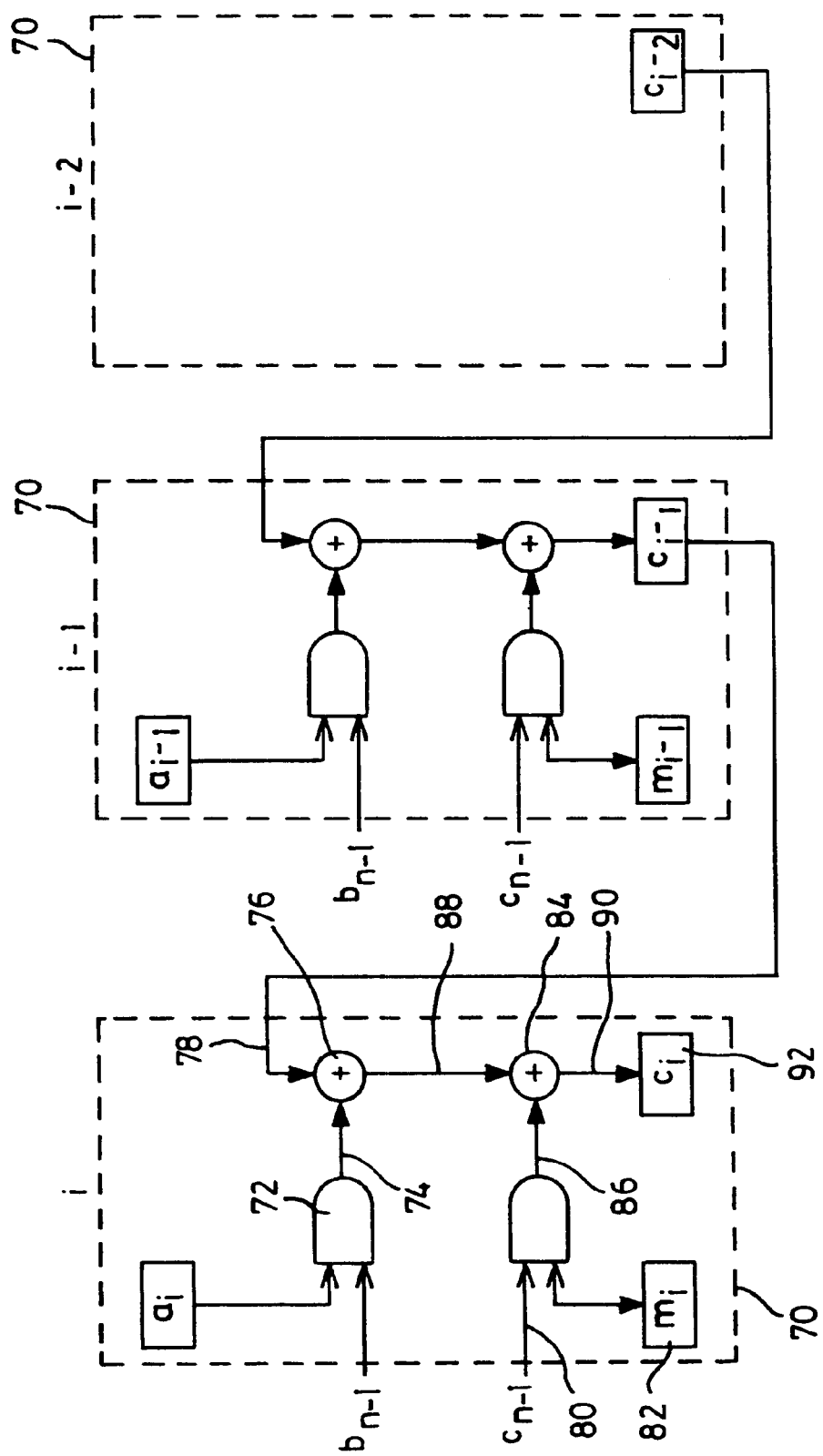
FIG. 6 is a circuit diagram of a finite-field multiplier of the bit-slice shown in FIG. 5.

Referring to FIG. 6, a detailed circuit implementation of the bit-slice 41 of FIG. 5 for finite field multiplication is indicated by numeral 70. Referring to bit-slice i, 70 of FIG. 6, (only three bit-slices are shown for the purpose of illustration in FIG. 6), the cell $a_i$ is ANDed with the add control signal $b_{n-1}$ by an AND gate 72. The output 74 of the AND gate 72 is connected to an input of an XOR gate 76 along with an input 78 from adjacent cell $C_{i-1}$ of the accumulator C. Thus implementing the calculation of the term "$c_{j-1}+b_j a_i$". The term "$c_{n-1} m_j$" is implemented by ANDing the signal $c_n$ 80 with $m_i$ 82 utilizing an AND gate 84. The output 86 of the AND gate 84 is connected to the input of an XOR gate 84, along with the output 88 of XOR gate 76. The output 90 of XOR gate 84 is connected to cell $C_i$ 92. Thus implementing the expression "$c_j=c_{j-1}+b_j a_i+c_{n-1} M_j$". With this general sequential multiplier, the product of two n-bit finite field elements will be produced in n clock cycles. It is preferable that a synchronous counter, which may be contained in the controller 20, provides control of the number of iterations. The preceding description applies to integer modular multiplication when adder 54 is a bit slice of an integer adder and adder 56 is a bit slice of an integer subtractor, as will be described later.

Addition

Although the circuitry has been described with reference to multiplication in a finite field $F_2^n$, other computational operations may also be performed with ease. Finite field addition has an advantage over integer arithmetic in that no carries are produced. The computation of a finite field sum requires only that an XOR gate be introduced at each cell of the registers in question since addition of two elements a and b in a finite field is apply a XOR b. Thus, referring back to FIG. 5, an input 100 is provided to the first adder 54 from cell $B_i$, and the second adder 56 is used for reduction. The output from adder 54 is then written directly into cell $C_i$. After the operands have been moved into registers a and b, the addition can be performed in a single clock cycle. It is also possible for the operation to be performed in the ALU and the result written back into a general register in the register file. For integer addition adder 54 is a bit slice of an integer adder and the result must be checked for modular overflow. If this condition arises adder 56 which is a bit slice of an integer subtractor is used to reduce the result.

Squaring

Squaring a number can be performed in the same time as multiplication of two different numbers. Squaring in a polynomial basis can be performed in a single clock cycle, if the specific irreducible along with the squaring expansion is explicitly hardwired. As an alternative squaring may be performed with multiplication of identical inputs.

Inversion

Inversion of finite field elements in $F_2^n$ may be performed using the extended Euclidean algorithm and utilizing four of the special purpose registers with additional control logic. This will be completed in 2n cycles if the shifting is made concurrently to the adds (which is easily implemented by hard wiring the outputs of the add to the next register cell).

Figure 7:
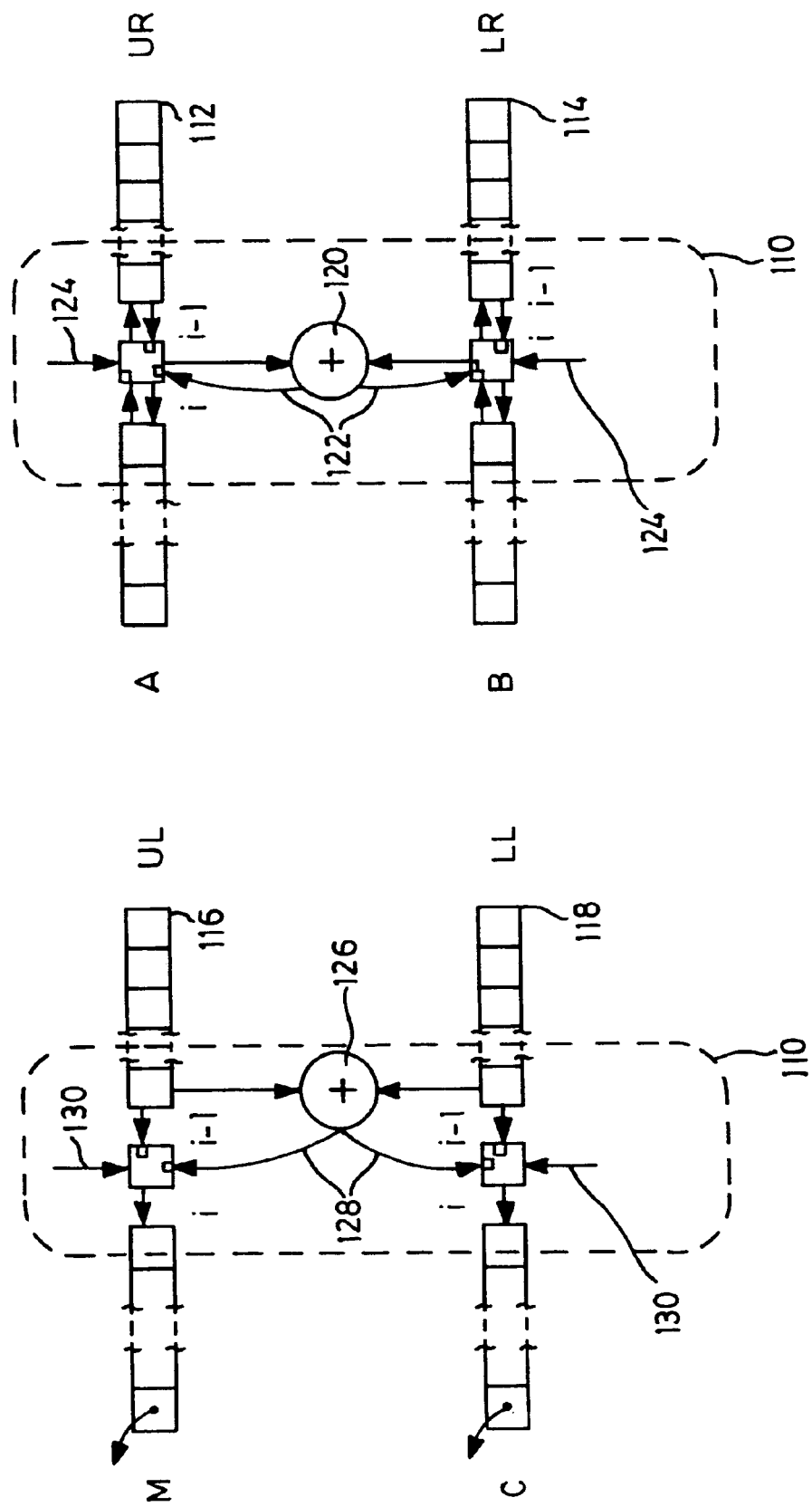
FIG. 7 is a block diagram of an arithmetic inverter.

The registers used in the inversion are A, B, M and C. For convenience these registers are schematically shown in FIG. 7 wherein they are assigned the following labels: M:UL; C:LL; A:UR; and B:LR. Once again the operation may be described with reference to a bit-slice 110.

The operands in an inversion are generally: an element to invert g; an irreducible polynomial f or modulus m (described later); a bit vector '0' and a bit vector '1.' The UL register 116 is loaded with f or m. The LL register 118 is loaded with g, the UR register 112 is loaded with '0' and the LR register 114 is loaded with '1'. For the UR and LR registers 112 and 114, respectively, cells $UR_i$ and $LR_i$ are XORed together by XOR gate 120 to produce an output 122. A control signal 124 determines whether one of three possible inputs is written in cell $UR_i$ and $UL_i$. The inputs are either a left or right shift from adjacent cells or the output 122. The control signal B determined by the state table to be described below. For the UL or LL registers 116 and 118, respectively, cells $UL_I$ and $LL_I$ are XORed together by XOR gate 126 to produce an output 128. A control signal 130 determines whether one of two possible inputs is written into cell $UL_i$ and $LL_i$. The inputs are either a left shift from the adjacent cell (i–1) or the output 128. Once again the control signal 130 is determined by the state table to be described below.

If we assume the control variables to be $k_u$–the length of the UL register and $k_l$–the length of the LL register. Then $\Delta = k_u - k_l$. The values $k_l$ and $k_u$ are implemented preferably with synchronous countdown counters, and Δ is implemented preferably with a synchronous up/down counter. Counter registers $k_u$, $k_l$ and Δ are also provided. The UL and LL registers are left shift registers while the UR and LR registers are both left and right shift registers.

Furthermore, for the count registers, $\Delta$ is loaded with 0, $k_u$ is initialized to n. A control bit latch provides a toggle function wherein a '1' designates an up count and a '0' designates a down count. The U/D control is initially set to '1.' Then a sequencer contained in the controller for performing the inversion in the ALU has the following outputs:

| | |
|---|---|
| deckl | Decrement $k_l$ kl |
| decku | Decrement $k_u$ ku |
| decDelta | Decrement $\Delta$ |
| incDelta | Increment $\Delta$ |
| toggle | Toggle UP/DOWN |
| lsUL | left-shift Upper Left register |
| lsLL | left-shift Lower Left register |
| lsUR | left-shift Upper Right register |
| lsLR | left-shift Lower Right register |
| rsUR | right-shift Upper Right register |
| rsLR | right-shift Lower Right register |
| outLR | Output Lower Right register |
| outUR | Output Upper Right register |
| dadd-lsLL | Down XOR and left-shift Lower Left register |
| uadd-lsUL | Up XOR and left-shift Upper Left register |

A state table outlining the action of the inverter follows, wherein $M_u$ and $C_l$ are the upper bit of registers UL and LL respectively and wherein $M_u$ and $C_l$ determine the current state. When an action is performed on the registers and counters which places the inverter in a new state. The process is repeated until either $k_u$ or $k_l$ are zero and one of the right register RL or RU will contain $g^{-1}$, the other will contain the modulus itself which may be restored to register m for use in multiplication or inversion operations to follow.

| U/D | $k_u$ | $k_l$ | $\Delta$ | $M_u$ | $C_l$ | Action |
|---|---|---|---|---|---|---|
| X | 0 | X | X | X | X | OutLR |
| X | X | 0 | X | X | X | OutUR |
| 1 | $\bar{0}$ | $\bar{0}$ | 0 | 0 | 1 | Deck$_u$, dec $\Delta$, lsUL, lsUR, toggle |
| 1 | $\bar{0}$ | $\bar{0}$ | $\bar{0}$ | 0 | 1 | Deck$_u$, dec $\Delta$, lsUL, rsLR |
| 0 | $\bar{0}$ | $\bar{0}$ | X | 0 | 1 | Deck$_u$, dec $\Delta$, lsUL, lsUR |
| 0 | $\bar{0}$ | $\bar{0}$ | 0 | 1 | 0 | Deck$_l$, inc $\Delta$, lsLL, lsLR, toggle |
| 0 | $\bar{0}$ | $\bar{0}$ | $\bar{0}$ | 1 | 0 | Deck$_l$, inc $\Delta$, lsLL, rsUR |
| 1 | $\bar{0}$ | $\bar{0}$ | X | 1 | 0 | Deck$_l$, inc $\Delta$, lsLL, lsLR |
| 0 | $\bar{0}$ | $\bar{0}$ | 0 | 1 | 1 | Deck$_l$, inc $\Delta$, Dadd-lsLL, lsLR, toggle |
| 0 | $\bar{0}$ | $\bar{0}$ | $\bar{0}$ | 1 | 1 | Deck$_l$, inc $\Delta$, Dadd-lsLL, rsUR |
| 1 | $\bar{0}$ | $\bar{0}$ | 0 | 1 | 1 | Deck$_u$, dec $\Delta$, Uadd-lsUL, lsUR, toggle |
| 1 | $\bar{0}$ | $\bar{0}$ | $\bar{0}$ | 1 | 1 | Deck$_u$, dec $\Delta$, Uadd-lsUL, rsLR |

Integer Arithmetic

The extreme similarity of polynomial and integer representations allows for the sharing of hardware in the ALU. For addition, the integer arithmetic is only complicated by the requirement for carries. The integer arithmetic operations of the ALU are best illustrated by way of example utilizing a multiplication operation.

Multiplication in Z is illustrated by way of reference to the following sequence of steps represented in pseudo-code, wherein as earlier, a and b are bit vectors to be multiplied and c is the product of a and b, and wherein $c=(c_0, c_1, \ldots c_{n-1})$.

C=0
M=0
For i from 0 to n−1 do
  $C^{ext} \leftarrow C$
  For j from 0 to n−1 do
    $C_j = (b_i(a_j) + m_j + c_j) \bmod 2$
    $M_{j+1} = (b_i(a_j) + m_j + c_j)/2$ And where
  $C^{ext} \leftarrow C$: For j from n−1 to 0 do
    $c_{j-1} = c_j$
    $c_{j-1}^{ext} = c_j^{ext}$ Analogously, this may be used to invert integers modulo p if the XOR's are replaced with subtractors and the m register is loaded with the prime. As a refinement carry—save methods may be employed to delay carry propagation.

It may be observed that the bit-slices 70 for finite field multiplication illustrated in the embodiment of FIG. 6, may be modified to include multiplication for integer representations. It may also be noted that for integer multiplication, the registers are loaded with the bit vectors in reverse order from that of $F_2m$ i.e. the leftmost cell of a register contains the LSB of the bit vector. In integer number multiplication, it is necessary to implement carries between successive partial products, furthermore as the partial products are not being reduced by a modulus the carries from the addition of successive partial products must be provided for. Thus the accumulator register C is extended and a new register $C^{ext}$ 49 is provided as shown in FIG. 5. Before each partial product is formed, the lowest bit of the accumulator C (cell $C_M$) is shifted into the topmost bit of the extension register $C^{ext}$ (cell $C^{ext}_{-1}$) and then both the accumulator C and $C^{ext}$ are shifted toward the LSB by one bit. The final result is obtained in C and $C^{ext}$ wherein $C^{ext}$ contains the low order bits of the product. This is represented by the operation $C^{ext} \leftarrow C$ above.

Figure 8:
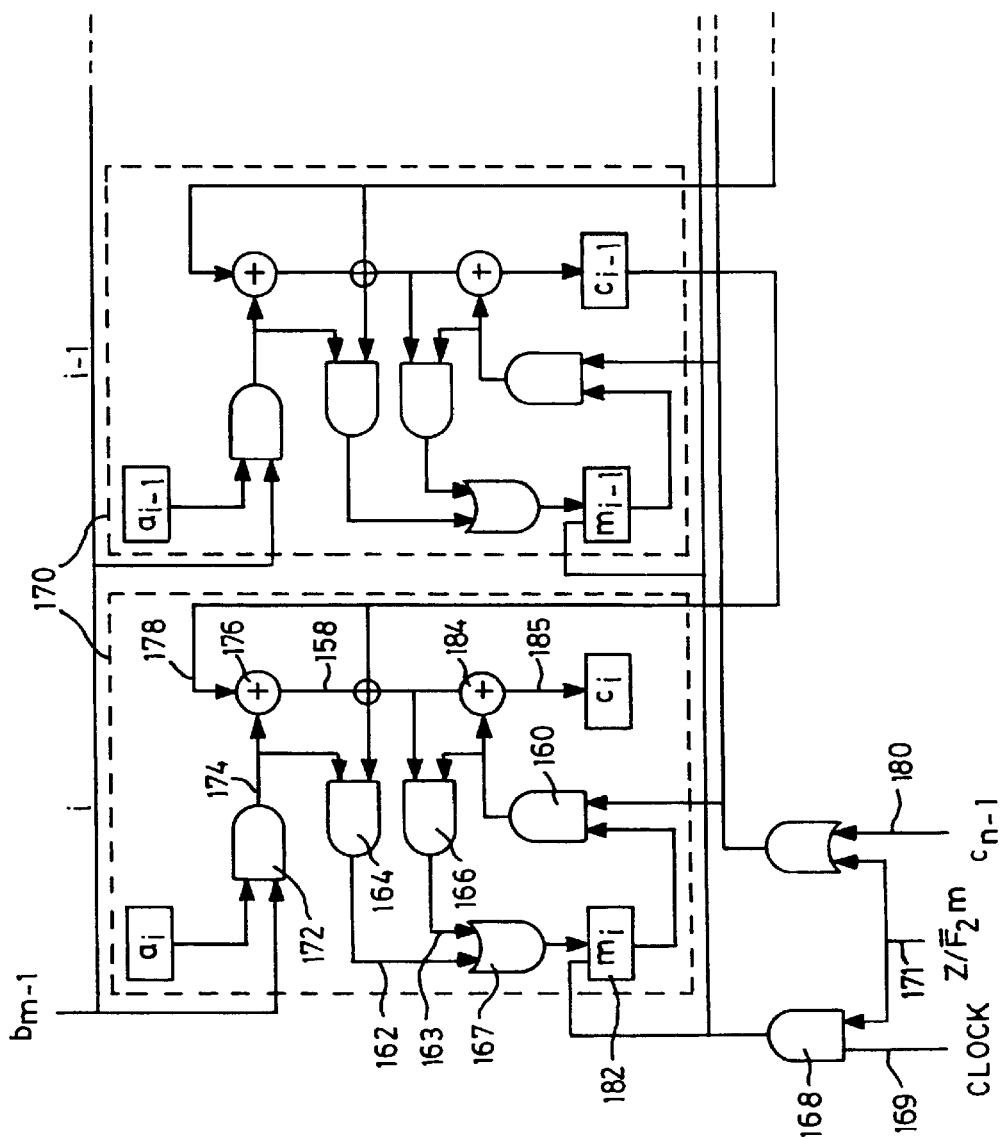
FIG. 8 is a circuit diagram of a combined finite-field/integer multiplier.

Referring now to FIG. 8 a bit-slice 170 is shown, and which is similar to the bit-slice 70 of FIG. 6. Accordingly the reference numerals used in the description of FIG. 6 will be used to identify like components with a prefix 100 added i.e. reference numeral 70 will become 170. The arrangement of FIG. 8 differs from FIG. 6 in two important ways; the modulus register m is used as a carry register, and a mode selection signal $Z/F_2m$ 171 is provided.

Now the terms $c_j = c_{j-1} + b_i a_i + c_{n-1} m_j$ are implemented as before for the finite field multiplication with the product of the control signal $b_m$ and the contents of register cell $A_i$, implemented by AND gate 172. The output 174 of the AND gate 172 is XORed with the contents of register cell $c_{j-1}$ by XOR gate 176 to produce an output term $c_{j-1} + b_i(a_i)$ indicated by numeral 158. This output signal is XORed using XOR gate 184 with the term '$c_{n-1}(m_j)$' indicated by numeral 185, derived from the AND gate 160 to produce the term $c_j$. In addition, a carry term $m_i$ is produced from the sum of the respective products '$b_i a_i \cdot c_{j-1}$' 162 and '$(c_{j-1} + b_i a_i \cdot m_j)$' 163 and written into cell $m_i$ 182. The product terms 162 and 163 are implemented by AND gates 164 and 166 respectively. The sum of the terms 162 and 163 are implemented by OR gate 167.

The mode selection signal Z 171, is ORed with the carry input signal $c_n$ 180 and is also ANDed 168 with clock signal 169. Thus by setting Z=0, will implement finite field arithmetic and by setting Z=1 will implement integer arithmetic.

Thus the modifications necessary to convert the finite field multiplier given previously in FIG. 6 into a combined finite field/integer multiplier are shown in FIG. 8. Note that the output register C is extended to collect the low order bits of the multiplication. As computations in Z are performed without a modulus, The modulus register M is not used to reduce the partial products but as a holder of the carries. The control signal $Z/F_2^M$ 171 enables the integer multiplication circuitry for the ALU.

A final carry propagation may be provided by a Manchester ripple chain, possibly extended by a carry-skip mechanism of one or two layers owing to the long register length.

It is also possible to clock for n more cycles, allowing the carry save adders to completely merge the carries.

Two's complement subtraction can be implemented in the carry propagation adder provided that one input can be conditionally complemented at its input and that a 'hot' carry-in is made at the LSB of the adder.

When multiplying, the ripple-carry will be intolerable even if improved by the carry-skip, but this carry propagation can be almost entirely removed by using a carry-save adder which provides a redundant representation of the partial product, which is only resolved after the multiplication is complete.

Figure 9:
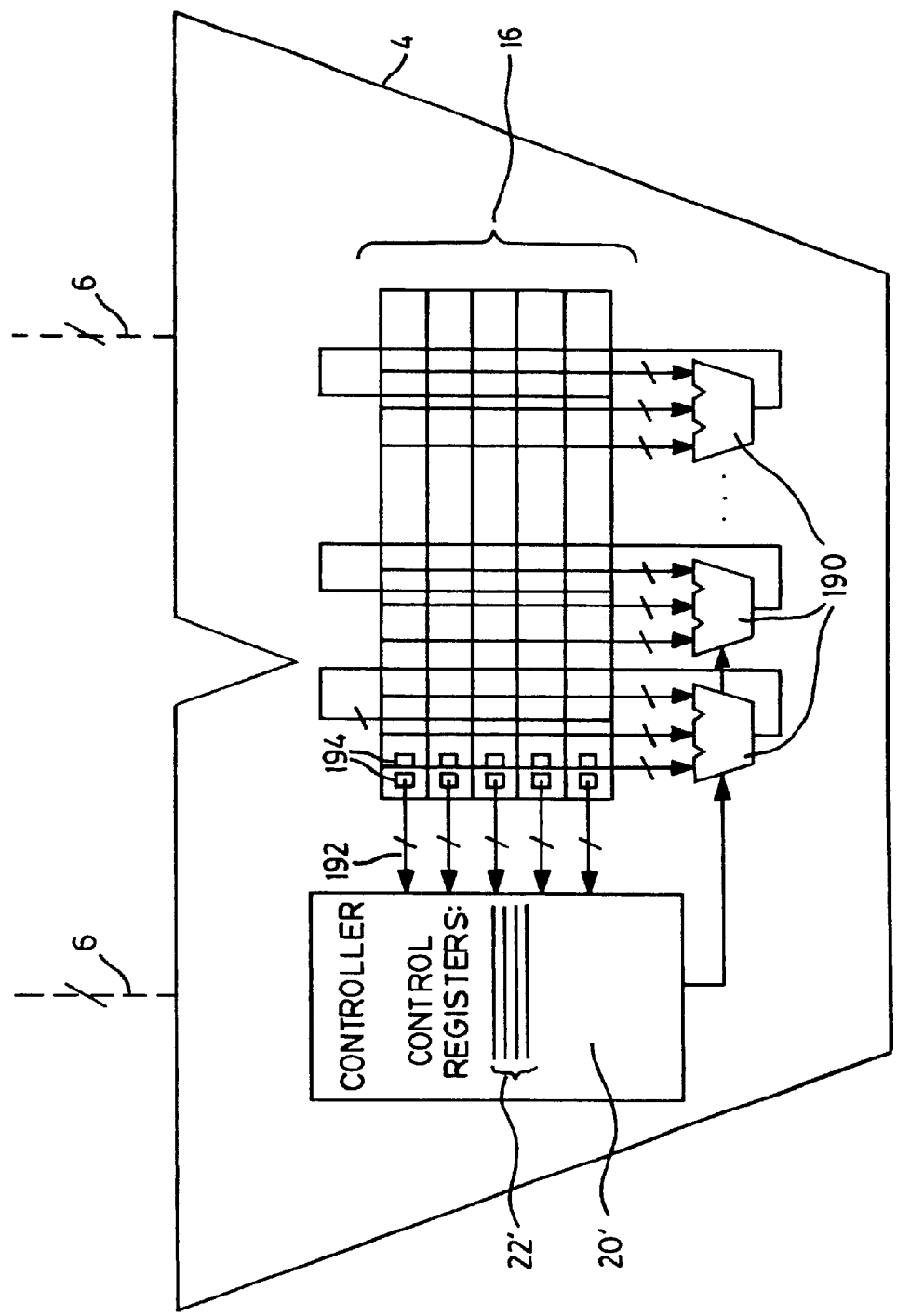
FIG. 9 is a block schematic diagram showing an embodiment of a multi-bit ALU of FIG. 1.

In a further embodiment the ALU 4 may be modified to provide a linear increase in computation speed as shown in FIG. 9. This is achieved by processing consecutive bits from the special-purpose registers 16' at once, and implementing additional circuitry indicated by the modified sub ALU's 190 to process the incremental additions as schematically illustrated in FIG. 9. Processing multiple bits then results in a linear increase in speed. For example, where a computation is performed sequentially two or more steps in the sequence may be performed simultaneously. In this case the controller 20' will process two or more control bits 194 from the special-purpose registers 16', and the inputs 192 to the controller are indicated in FIG. 9 as multi-bit lines.

Figure 10:
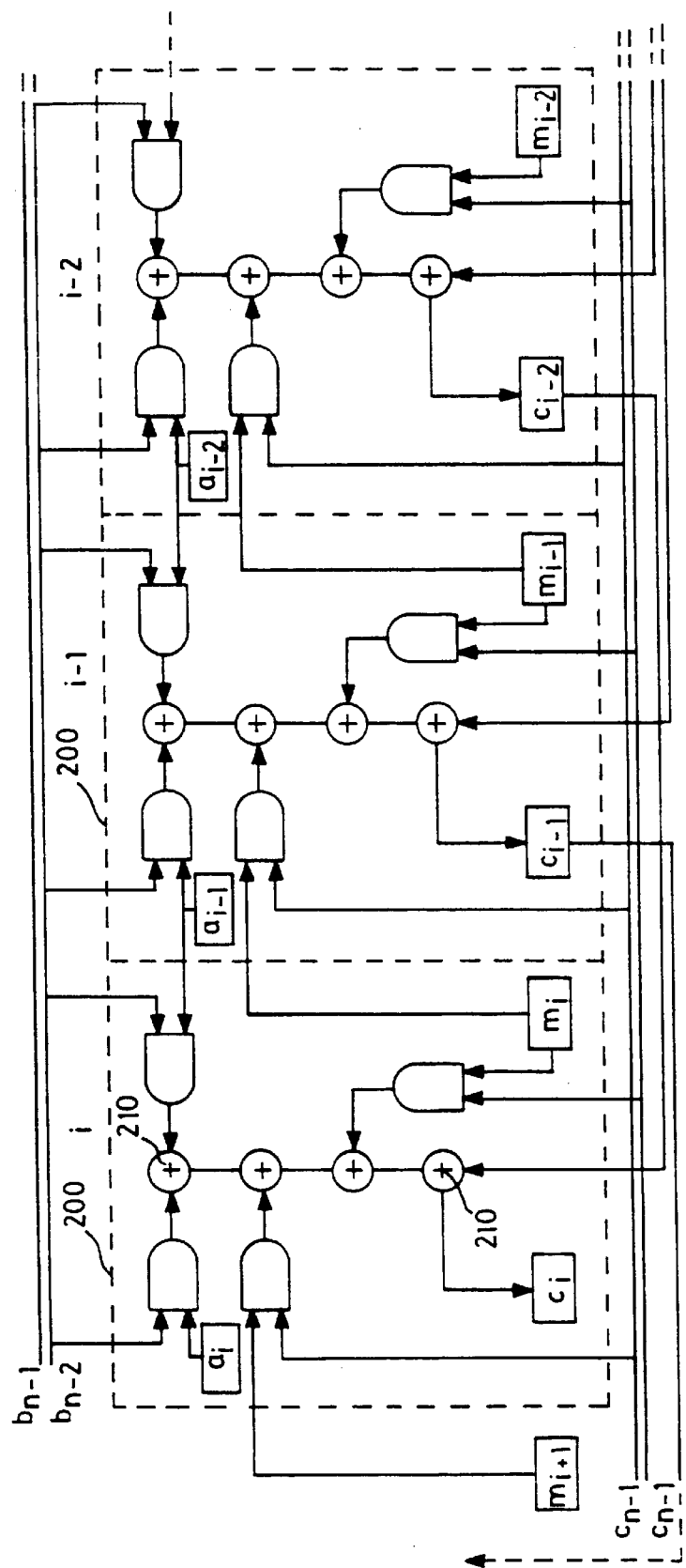
FIG. 10 is a circuit diagram of the multi-bit finite-field multiplier of FIG. 9.

A circuit diagram of a two-bit at a time multiplier for finite fields is shown in FIG. 10. In this implementation, the bit-slices 200 have twice the number of XOR gates 210, implementing two terms of the addition, the circuit takes two bits of multipliers and adds in two adjacent shifts of the multicand $a_i$ and $a_{i-1}$, and reduces with two adjacent shifts of the modulus $M_i$ and $M_{i-1}$. This has the effect of simultaneously producing two consecutive partial products with modulus reduction, thus halving the total computation time.

It should also be noted that the top-bits of the special-purpose registers are used as control bits for the controllers 20' or 20. This has the advantage that when the operands are loaded into the registers, they are aligned left; thus control is always obtained from a fixed bit location. However, other bits may be used as a control bits, e.g. the bottom bits; however, this may additionally increase the complexity of the hardware.

Again, multi-bit operation potentially providing improved linear increase in computation speed, since such options as Booth (or modified-Booth) recoding become possible.

It is assumed that the ALU will also be able to perform simple arithmetic operations on general registers. An alternative is to have all arithmetic performed on ALU internal registers, with the general-purpose registers able only to read and write these registers.

The functionality of the ALU will include integer addition, utilizing some carry propagation method, such as a ripple carry or the combination of carry skip addition and carry completion.

The ALU will also provide simple XOR functionality for use in finite field addition. Since the integer and finite field representations (bit orders) are reversed, it is beneficial to provide a bit reversal mechanism for use in field to integer and integer to field conversions. The tops of two shift registers are connected to provide for this facility in n clock cycles, where n is the length of the arithmetic operands.

The general architecture given here has the potential not only to share the register file between EC and modular exponential arithmetic, but also to share special purpose registers and even combinational logic, in addition to shared control registers.

While the invention has been described in connection with a specific embodiment thereof and in a specific use, various modifications thereof will occur to those skilled in the art without departing from the spirit of the invention. For example it may be noted that in the embodiments described, reference is made to specific logic circuits, however equivalent circuits may be used, for example by using de Morgans Rule or if inverted logic is implemented then complementary circuits may be used. In addition, when referring to the orientation of the registers and bit vectors, i.e. left, right, top, bottom, other arrangements of these directions are also implied.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the invention.

We claim:

1. An arithmetic processor comprising:

(a) an arithmetic logic unit having a finite field arithmetic circuit for performing finite field arithmetic operations and a modular integer arithmetic circuit for performing modular integer arithmetic operations, the arithmetic logic unit having an operand input data bus for receiving operand data thereon and a result data output bus for returning the results of said arithmetic operations thereon;

(b) a register file coupled to said operand data bus and said result data bus; and (c) a controller coupled to said ALU and said register file, said controller selecting one of said finite field operations or said integer arithmetic operations in response to a mode control signal and for controlling data access between said register file and said ALU and whereby said register file is shared by both said finite filed and integer arithmetic circuits.

2. An arithmetic processor as defined in claim 1, said register file including general-purpose registers and said ALU having a processing bit width greater than said operand buses data bit width.

3. An arithmetic processor as defined in claim 1, said controller being programmed with instructions for controlling a selected arithmetic operation of said arithmetic logic unit.

4. An arithmetic processor as defined in claim 1, said operand buses having a bit width the same as a processing bit width of said ALU and said result data bus bit width.

5. An arithmetic processor as defined in claim 4, said operand data bus including a first and second operand buses for coupling first and second operands respectively to said ALU.

6. An arithmetic processor as defined in claim 5, said general-purpose registers being individually addressable by said controller wherein data in multiple registers may be combined for computation by said ALU on field sizes greater than said processing bit width of said ALU.

7. An arithmetic processor as defined in claim 1, said controller being responsive to a field size control, whereby said ALU may operate on different field sizes.

8. An arithmetic processor as defined in claim 1, said arithmetic logic unit including a plurality of special purpose registers for receiving operands to be utilized in said arithmetic operations from said register file, a plurality of sub arithmetic logic units having combinatorial and logic circuitry elements coupling one or more bits of said special purpose registers and a sequencing controller responsive to control information received from said controller, said sequencing controller and containing counter and detection circuitry coupled to said special purpose registers and said plurality of sub arithmetic logic units, for controlling operations thereof in order to cause a sequence of steps to be performed in an arithmetic operation.

9. An arithmetic processor as defined in claim 8, said arithmetic logic unit for performing said arithmetic operations of finite field multiplication, squaring, addition, subtraction and inversion.

10. An arithmetic processor as defined in claim 8, said sub arithmetic logic units for performing XOR, shift, shift-XOR, add and subtract logical operations.

11. An arithmetic processor as defined in claim 1, said finite field arithmetic circuit comprising:

a finite field multiplier circuit having a plurality of special purpose registers including an A register and an B register for receiving first and second operand bit vectors respectively, an M register for receiving a modulus bit vector, and an accumulator for containing a finite field product of said operands;

logic circuitry establishing connections from respective cells of said A and B registers to cells of said accumulator; and a sequencing controller being operatively connected with said registers and said logic circuitry for implementing a sequence of steps to derive said finite field product.

12. An arithmetic processor as defined in claim 11, said sequencing of steps comprising: computing partial products of the contents of said A register with successive bits of said B register; storing said partial products in said accumulator; testing a bit of said partial product; reducing said partial product by said modulus if said tested bit is set and repeating said steps for successive bits of said B register.

13. An arithmetic processor as defined in claim 12, including storing said operand vectors left justified in said A register and said B register respectively and said test bit being derived from said left most bit of said registers.

14. An arithmetic processor as defined in claim 12, said B register is a shift register.

15. An arithmetic processor as defined in claim 14, said logic circuitry having a plurality of controllable adder units each coupled to respective register cells each comprising a first controllable adder having inputs derived from register cell $A_i$ and accumulator cell $C_i$ and being responsive to a first add control signal derived from cell $B_{N-1}$ of register B for producing a first add output signal;

a second controllable adder having inputs derived from modulus register cell $M_i$ and said add output signal and being responsive to an second add control signal derived from cell $C_{N-1}$ of said accumulator for producing an output which is coupled to accumulator cell $C_i$.

16. An arithmetic processor as defined in claim 15, including a finite field adder circuit.

17. An arithmetic processor as defined in claim 16, said finite field adder comprising means for coupling an input derived from said cell $B_i$ of register B to each of said first adders; and means for coupling said output of said second adder to said cell $C_i$, and said sequencing controller being responsive to a finite field add control signal whereby said finite field addition operation is performed in a single clock cycle.

18. An arithmetic processor as defined in claim 1, said finite field arithmetic circuit including a finite field inversion circuit.

19. An arithmetic processor as defined in claim 18, said finite field inversion circuit comprising:

a plurality of special purpose registers including an A register and a B register for receiving first and second operand bit vectors respectively, an M register for receiving a modulus bit vector, and an accumulator for containing a finite field product of said operands.

20. An arithmetic processor as defined in claim 1, said arithmetic logic unit comprising:

a finite field multiplier circuit;

a finite field inversion circuit;

a plurality of special purpose registers; logic circuitry establishing connections between respective cells of said special purpose registers; and a sequencing controller being operatively connected with said registers and said logic circuitry for implementing a sequence of steps to compute a finite field product or a finite field inversion and whereby said special purpose registers are shared by said finite field multiplier and said finite field inversion circuit.

21. An arithmetic processor as defined in claim 20, said finite field inversion circuit implementing an extended Euclidean algorithm.

22. An arithmetic processor as defined in claim 11, including an integer arithmetic multiplication circuit.

23. An arithmetic processor as defined in claim 12, said integer arithmetic multiplication being implemented by loading said m register with a carry in response to said mode selection signal.

24. An arithmetic processor as defined in claim 1, for use in a cryptographic system.

25. An arithmetic processor comprising:

a) an arithmetic logic unit having a finite field arithmetic circuit and a modular integer arithmetic circuit each for performing a group of associated arithmetic operations, the arithmetic logic unit having an operand input data bus for receiving operand data thereon and a result data output bus for returning the results of said arithmetic operations thereon;

b) a register file coupled to said operand data bus and said result data bus; and c) a controller coupled to said ALU and said register file, said controller selecting one of said plurality of arithmetic circuits in response to a mode control signal requesting an arithmetic operation and for controlling data access between said register file and said ALU and whereby said register file is shared by said arithmetic circuits.

* * * * *

UNITED STATES PATENT AND TRADEMARK OFFICE
CERTIFICATE OF CORRECTION

PATENT NO. : 6,349,318 B1
DATED : February 19, 2002
INVENTOR(S) : Vanstone, Scott et al.

It is certified that error appears in the above-identified patent and that said Letters Patent is hereby corrected as shown below:

Column 1,
Line 12, replace "require" with -- requires --

Column 2,
Line 44, replace "multiplier." with -- multiplier; --

Column 3,
Line 1, replace "is" with -- are --
Line 1, delete "in"
Line 30, replace "sub-ALU's" with -- sub-ALUs --
Line 32, replace "sub ALU's" with -- sub-ALUs --
Line 34, replace "sub-ALU's" with -- sub-ALUs --
Line 47, replace "sub-ALU's 16" with -- sub-ALUs 18 --
Line 49, replace "sub ALU's" with -- sub-ALUs 18 --
Line 58, replace "ALU's" with -- ALUs --
Line 59, replace "ALU's" with -- ALUs --
Line 60, replace "ALU's" with -- ALUs --
Line 66, replace "sub ALU's" with -- sub-ALUs --

Column 4,
Line 1, replace "sub-ALU's" with -- sub-ALUs --
Line 4, replace "sub ALU's" with -- sub-ALUs --
Line 9, replace "sub ALU's" with -- sub-ALUs --
Line 18, replace "sub ALU's" with -- sub-ALUs --
Line 56, insert -- . -- after "...$m_{n-1}$"

Column 9,
Line 39, delete "a"
Line 42, replace " providing" with -- provides --

UNITED STATES PATENT AND TRADEMARK OFFICE
CERTIFICATE OF CORRECTION

PATENT NO. : 6,349,318 B1
DATED : February 19, 2002
INVENTOR(S) : Vanstone, Scott et al.

It is certified that error appears in the above-identified patent and that said Letters Patent is hereby corrected as shown below:

Column 12,
Line 11, after "an", delete the paragraph break
Line 20, after "registers", insert a paragraph break Signed and Sealed this Eleventh Day of June, 2002

Attest:

Attesting Officer

JAMES E. ROGAN
Director of the United States Patent and Trademark Office